(12) United States Patent
Vergnano

(10) Patent No.: US 8,496,437 B2
(45) Date of Patent: Jul. 30, 2013

(54) POWER TRANSMITTING SYSTEM THROUGH CABLES FOR AIRBORNE WIND-TYPE POWER GENERATION APPLICATIONS

(76) Inventor: Giovanni Vergnano, Castelnuovo Don Bosco (IT)

( * ) Notice: Subject to any disclaimer, the term of this patent is extended or adjusted under 35 U.S.C. 154(b) by 470 days.

(21) Appl. No.: 12/742,626

(22) PCT Filed: Nov. 10, 2008

(86) PCT No.: PCT/IT2008/000699
§ 371 (c)(1),
(2), (4) Date: May 12, 2010

(87) PCT Pub. No.: WO2009/066334
PCT Pub. Date: May 28, 2009

(65) Prior Publication Data
US 2011/0103954 A1 May 5, 2011

(30) Foreign Application Priority Data
Nov. 21, 2007 (IT) .............................. TO2007A0833

(51) Int. Cl.
*F03D 11/02* (2006.01)
*F03D 5/02* (2006.01)
(52) U.S. Cl.
USPC ...................................... 416/170 R
(58) Field of Classification Search
USPC ................................. 416/31, 40, 41
See application file for complete search history.

(56) References Cited

U.S. PATENT DOCUMENTS

| 4,166,596 A | * | 9/1979 | Mouton et al. .................. 244/30 |
| 4,335,996 A | * | 6/1982 | Ross .............................. 416/88 |
| 2003/0104886 A1 | | 6/2003 | Gajewski | |

FOREIGN PATENT DOCUMENTS

| DE | 20112513 U1 | 2/2002 |
| DE | 10326002 A1 | 12/2004 |
| WO | 2005/103527 A1 | 11/2005 |

OTHER PUBLICATIONS

Gears! Gears! Gears! Pulleys Plus Accessory Set, 12 Pieces Building Set; by Gears! Gears! Gears!; May 2, 2007; http://web.archive.org/web/20070502205427/http:/www.amazon.com/Gears-Pulleys-Accessory-Pieces-Building/dp/B00000DMCF.*
Vergnano, Giovanni, International Search Report, issued in the parent International Patent Application No. PCT/IT2008/000699 by the European Patent Office on Dec. 3, 2010.

* cited by examiner

Primary Examiner — Nathaniel Wiehe
Assistant Examiner — Jeffrey A Brownson
(74) Attorney, Agent, or Firm — David A. Farah; Sheldon Mak & Anderson PC

(57) ABSTRACT

The present invention deals with a new system for transmitting energy through a cable and interconnected pulleys. The traditional power transmission through pulleys sizes the system of belts and friction surfaces depending on energy to be transmitted and is obtained through systems composed of a rotary element for every point of application and of a flexible element for the connection. In the proposed system, the flexible element is a high-resistance cable and friction on the rotary element is increased by using interconnected pulleys, which increase the cable friction surface allowing power transmissions without any sliding till the cable breaking point. The lightness of such system allows it to find optimum application in transmitting to ground all wind energy produced at an upper level. The system of interconnected pulleys is further applied to discontinuous tractions in the sailing field, replacing the traditionally used winches.

3 Claims, 4 Drawing Sheets

POWER TRANSMITTING SYSTEM THROUGH CABLES FOR AIRBORNE WIND-TYPE POWER GENERATION APPLICATIONS

CROSS-REFERENCE TO RELATED APPLICATIONS

The present application is a national stage of International Patent Application No. PCT/IT2008/000699, titled "Power Transmitting System Through Cables for Airborne Wind-Type Power Generation and Sail Winch-Driving Applications," filed Nov. 10, 2008, which claims priority from Italian Patent Application No. TO2007A000833 filed Nov. 21, 2007, the contents of which are incorporated in this disclosure by reference in their entirety.

BACKGROUND OF THE INVENTION

1. Field of the Invention

The present invention refers to a power transmitting system through cables, in particular for wind-type power generation and sail winch-driving applications.

2. Background Art

The generation of energy at an upper level, where strong and constant winds blow, has always encountered a difficulty linked to the weight of systems designed for such purpose.

One of the most complete studies about this subject has been made for the Skywindpower system, for which a prototype has been built, which can operate only with a great wind intensity: in fact, it can transform into energy only a reduced percentage of the wind that bumps into it, using the remaining part as support for its structure.

The main components of a wind-type generating system by rotation are rotor and generator, this latter one generally placed next to the rotor and connected to an electrical cable for transmitting generated energy to the ground. Regarding the generator, so far its placement has been thought at an upper level due to the difficulties of transferring generated energy to the ground. The generator weight therefore has remained the main obstacle to the development of wind generation at an upper level.

SUMMARY OF THE INVENTION

Object of the present invention is solving the above prior art problems by providing a power transmitting system that allows having the generator placed on the ground, thereby allowing to develop an efficient wind generator at an upper level.

The present invention is an innovation to typical traditional pulley-type transmissions, where size and mass of pulleys and belts depend on friction to be obtained, that must be greater than the force to be transmitted.

The above and other objects of and advantages of the invention, as will appear from the following description, are obtained with a power transmitting system like the one disclosed herein. Preferred embodiments and non-trivial variations of the present invention are the subject matter of the dependent claims.

It will be immediately obvious that numerous variations and modifications (for example related to shape, sizes, arrangements and parts with equivalent functionalities) can be made to what is described, without departing from the scope of the invention as appears from the enclosed claim.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

As stated above, the present invention uses the typical traditional pulley-type transmissions, where size and mass of pulleys and belts depend on friction to be obtained, that must be greater than the forces to be transmitted. The big winches used on sailing boats, coupled with fiber cables with an optimum weight/resistance ratio, are a good example of a discontinuous energy transmission, where the necessary friction on the drum is obtained with many cable windings.

Figure 1:
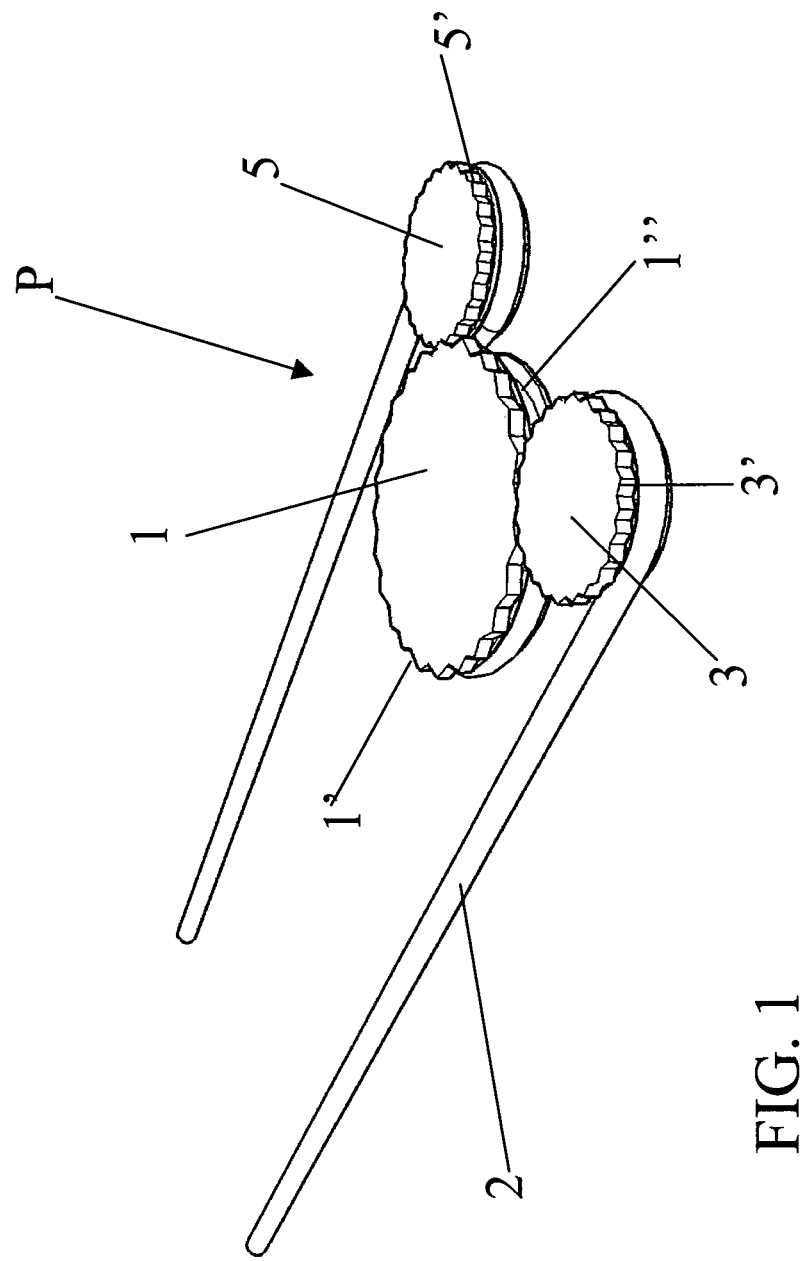
FIG. 1 shows a perspective view of a preferred embodiment of the power transmitting system according to the present invention useful for a wind-type generating application.
Figure 2:
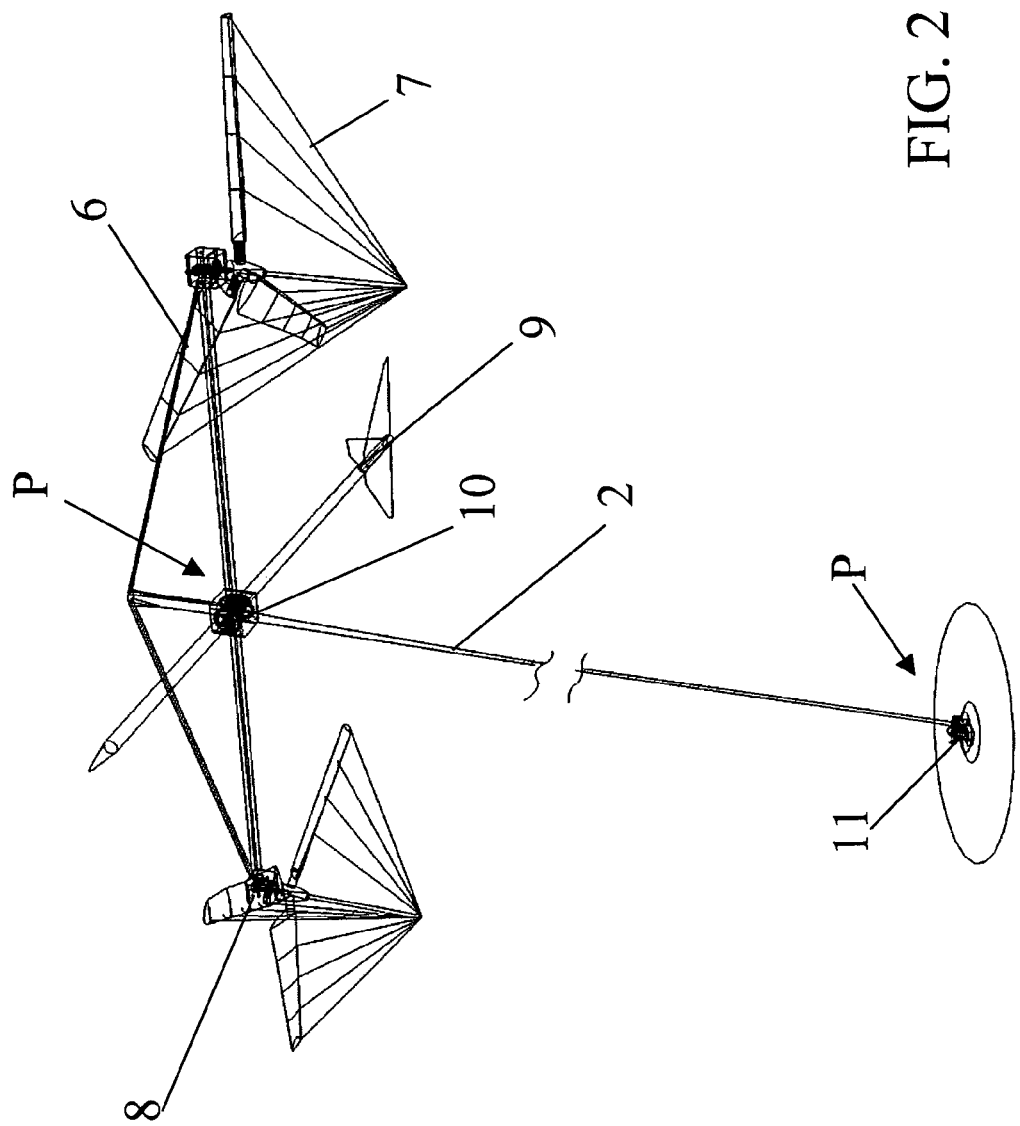
FIG. 2 shows a schematic perspective view of a wind-type generating application that uses the power transmitting system of FIG. 1.
Figure 3:
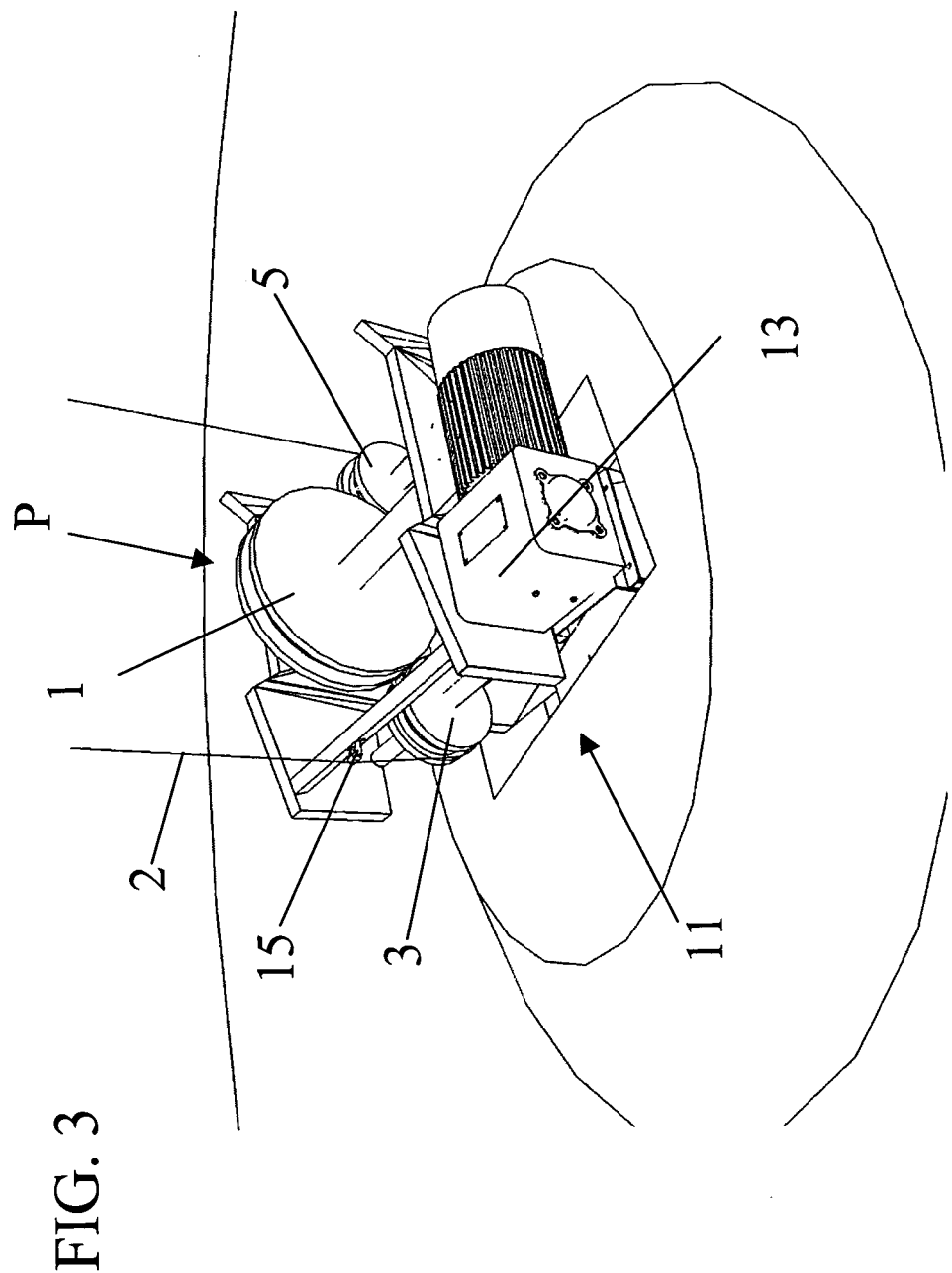
FIG. 3 shows a detailed perspective view of the power transmitting system applied to a generator of the application of FIG. 2.

In order to increase the friction surfaces between pulleys and cable, without needing many windings on the same rotary element, and in order to give continuity to energy transmission through cables, it is necessary to modify the system of winches by creating special, mutually mechanically interconnected pulleys (FIG. 1), with a high-resistance cable with pre-established length that is closed as a loop (like in the application in FIG. 2).

The principle of power transmission is similar to the one of a bicycle chain, with a traction cable 2 (FIG. 2). The number of mutually mechanically interconnected pulleys 1, 3, 5 and the number of connected force points change depending on performances to be obtained.

Regarding the application of the power transmitting system P of the present invention to a wind-type power generating application with rotation, referring to FIG. 2, a rotor 6 is shown with reduced weight (in order to allow its use in aeolian applications at an upper level) due to the use of tie-rods 7 that allows emulating the performances of a turbine 8 with reduced weight.

The transmitting system P described in the aeolian application operates differently from the bicycle example, since, in case of a bicycle, the energy transmission occurs between two fixed points, while in case of the aeolian generating system at an upper level, there is a moving point at an upper level, and therefore there is the need of having, on such moving point, a traction force in an opposite direction and with a force greater than the force to be transmitted.

When there is wind, the aerodynamic shape of the aeolian generator (and its possible integration with power wing profiles or kites that increase lift or the use of auxiliary supporting means that are lighter than air) can guarantee the prevalence of the traction force on force to be transmitted.

The rotation of the blades 8 of the wind-type generator 9 moves the pulley assembly 10 which exerts a traction on cable 2. On the ground, the generator assembly 11 contains a generator 13 with variable energy absorption, that is rotated by the traction of cable 2 by means of its own power transmitting system P with pulleys 1, 3, 5, generating a balanced system in which the wind-type generator 9 will keep its position at an upper level stable.

A suitable sensor 15 for sensing the cable 2 tension allows adjusting the energy absorption by the generator 13. The block of ground system rotation will produce a recovery of the wind-type generator 9 by self-traction on the traction cable 2. With no wind, the recovery of the wind-type generator 9 will be possible by shortening the cable 2 obtained with a suitable motor (not shown). The recovery will occur according to the same principle of an helicopter placed in self-traction.

The proposed system P can be equipped with one or more mechanically interconnected rotors 6.

Regarding the application of the power transmitting system P to sail winches (FIG. 4), winding on a rotary winch of ropes 2 on which a traction has to be exerted, and handling of the winch with suitably, manually-operated demultipliers, is a complex operation, which is also dangerous when a rope under traction has to be put in force, or when the same rope has to be quickly released.

The present invention avoids the need of intervening on the ropes 2, since they can be used in all required functions without modifying their path in the pulleys 1, 3, 5. In fact, by using the system P of the invention as a winch, the system P itself allows operating by traction of the cable 2, by keeping the traction or, by simply transforming the traction pulleys 1, 3, 5 into more or less braked free-rotating wheels, in order to more or less quickly free the cable 2 itself.

The complete removal of every danger will be obtained with the use of a system for collecting the free rope 2 through coils 16, 18 or another technology, that avoids the risk of dangers with things or people. The same technology is valid for automatic mechanical drive, nowadays made with more complex and costly drum-type winches.

In summary, the above described invention relates to a power transmitting system P comprising at least one first pulley 1 adapted to operatively cooperate with at least one second pulley 3, 5, and a cable 2 adapted to pass in succession around a circumference of the first pulleys 1, then around a circumference of the second pulley 3, 5 in order to perform a path adapted to provide an extended friction surface for the cable 2.

Obviously, the second pulleys 3, 5 could be more than one (in the Figures, two second pulleys 3, 5 are for example shown) and the respective diameters of the first pulley 1 and the second pulleys 3, 5 could be identical, or different.

For example, according to the embodiment shown in the Figures, the power transmitting system P comprises at least one first pulley 1 having a first diameter and adapted to operatively cooperate with at least two second pulleys 3, 5, each having a second diameter, the first diameter being greater than the second diameter, and a cable 2 adapted to pass in succession around a circumference of one (3) of the two second pulleys 3, 5, then around a circumference of the first pulley 1, and then around a circumference of another one (5) of the two second pulleys 3, 5 in order to perform a path adapted to provide an extended friction surface for the cable 2.

Moreover, the first pulley 1 is equipped on its surface with a plurality of teeth 1' and has a smooth circumferential part 1" onto which the cable 2 is wound, the second pulleys 3, 5 are equipped on their surface with a respective plurality of teeth 3', 5' and have a smooth circumferential part 3", 5" onto which the cable 2 is wound, the first pulley 1 being adapted to operatively cooperate with the second pulleys 3, 5 through their respective teeth 1', 3', 5'.

In the arrangement shown in FIG. 2, a first power transmitting system P is operatively connected with a generator 13 placed on a ground and adapted to generate energy coming from an aeolian generator 9 placed at an upper level and operatively connected to a second power transmitting system P, the first and second power transmitting systems P being also mutually operatively connected through the same cable 2.

Figure 4:
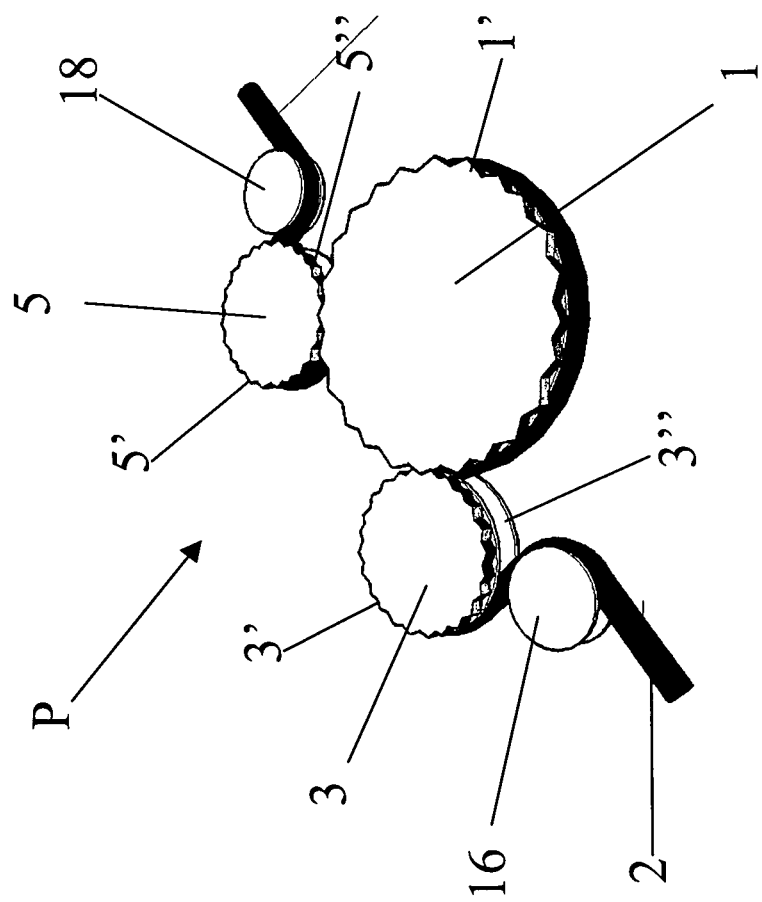
FIG. 4 shows a perspective view of another preferred embodiment of the power transmitting system according to the present invention useful for a sail winch-driving application.

In the sail winch-driving arrangement shown in FIG. 4, instead, the power transmitting system P can also be adapted to be operatively coupled to at least one first coil 16, 18 by passing the cable 2 exiting one of the second pulleys 3, 5 around the first coil 16, 18. And moreover, the power transmitting system P can be adapted to be operatively coupled also to at least one second coil 16, 18 by passing the cable 2 exiting one of the second pulleys 3, 5 around the first coil 16, 18 and by passing the cable 2 exiting another one of the second pulleys 3, 5 around the second coil 16, 18.

With such arrangement and the related increase of friction surfaces, the transmission of power is enabled for applications that alternate traction steps with release steps, such as for example in case of sailboat winches.

Returning to FIG. 2, the wind-type power generating arrangement preferably comprises:
- at least one aeolian generator 9 placed at an upper level equipped with rotating blades 8 and operatively connected to a power transmitting system P of the invention;
- at least one power-generating assembly 11 placed on the ground and comprising a generator 13 and a power transmitting system P of the invention; and
- a cable 2 adapted to operatively connect the aeolian generator 9 and the power-generating assembly 11.

The above wind-type power generating arrangement can further comprise at least one sensor 15 for sensing a tension on the cable 2 and adapted to regulate an energy absorption by the generator 13.

With such arrangement and the related increase of friction surfaces, the transmission of power is enabled between an aerodynamic system for picking-up wind energy placed at an upper level and a system for transforming energy placed on the ground.

The invention claimed is:

1. A first power transmitting system comprising: one first pulley and two second pulleys; where the first pulley comprises a first circumference and a first diameter; where the first pulley is connected with the second pulleys; where each of the second pulleys comprises a second diameter and a second circumference; where the first diameter is greater than the second diameter; and where the first power transmitting system further comprises a cable, the cable being wound in succession around the second circumference of one of the two second pulleys, then around the first circumference of the first pulley, and then around the second circumference of another one of the two second pulleys; where the first pulley further comprises a first surface with a plurality of teeth and comprises a smooth circumferential part onto which the cable is wound; where the second pulleys further comprise a second surface with a plurality of teeth and comprise a smooth circumferential part onto which the cable is wound; where the teeth of the first surface of the first pulley cooperate with the teeth of the second surfaces of the second pulleys; where the first power transmitting system is connected with a ground generator placed on ground, the first power transmitting system being connected to an aeolian generator having blades to generate energy from wind, the aeolian generator being also connected to a second power transmitting system, the second power transmitting system comprising: one first pulley and two second pulleys; where the first pulley comprises the first circumference and the first diameter; where the first pulley is connected with the second pulleys; where each of the second pulleys comprises the second diameter and the second circumference; where the first diameter is greater than the second diameter; and where the second power transmitting system further comprises the cable, the cable being wound in succession around the second circumference of one of the two second pulleys, then around the first circumference of the first pulley, and then around the second circumference of another one of the two second pulleys; where the first pulley further comprises the first surface with a plurality of teeth and comprises the smooth circumferential part onto which the cable is wound; where the second pulleys further comprise the second surface with a plurality of teeth and comprise the smooth circumferential part onto which the cable is wound; where the teeth of the first surface of the first pulley cooperate with the teeth of the second surfaces of the second pulleys, the first and second power transmitting systems being mutually connected through the cable, the first power transmitting system being connected to the aeolian generator through a rotor connected with tie-rods to the blades of the aeolian generator, a rotation of the blades moving the first power transmitting system which exerts a traction on the cable, the second power transmitting system being connected with the ground generator along a rotation axis of the first pulley, the ground generator being rotated by the traction on the cable performed by the aeolian generator.

2. The first power transmitting system of claim 1, where the cable, after being wound onto one of the second pulleys, is then further wound onto a first coil.

3. The first power transmitting system of claim 1, where the cable, after being wound onto one of the second pulleys, is then further wound onto a first coil, and the cable, after being wound onto another one of the second pulleys, is then further wound onto a second coil.

* * * * *